United States Patent [19]

Tupman

[11] Patent Number: 4,691,385

[45] Date of Patent: Sep. 1, 1987

[54] OPTICAL COMMUNICATION APPARATUS FOR A VEHICLE

[75] Inventor: David J. Tupman, Mentor, Ohio

[73] Assignee: Caterpillar Industrial Inc., Mentor, Ohio

[21] Appl. No.: 773,141

[22] Filed: Sep. 5, 1985

[51] Int. Cl.$^4$ ............................................. H04B 9/00
[52] U.S. Cl. ...................................... 455/607; 356/152
[58] Field of Search ............... 455/606, 607, 617, 69, 455/608, 604; 356/141, 152, 138, 153; 340/825.54

[56] References Cited

U.S. PATENT DOCUMENTS

| | | | |
|---|---|---|---|
| 3,305,861 | 2/1967 | Webb | 455/69 |
| 3,402,630 | 9/1968 | Blau et al. | 455/604 |
| 3,546,701 | 12/1970 | Kurth | 343/179 |
| 3,705,986 | 12/1972 | Sanders et al. | 455/607 |
| 4,025,791 | 5/1977 | Lennington et al. | 250/341 |
| 4,121,102 | 10/1978 | Wilson | 250/341 |
| 4,207,468 | 6/1980 | Wilson | 250/341 |
| 4,236,255 | 11/1980 | Burgener | 455/603 |
| 4,295,740 | 10/1981 | Sturges | 356/152 |
| 4,398,172 | 8/1983 | Carroll et al. | 340/38 |

FOREIGN PATENT DOCUMENTS

| | | |
|---|---|---|
| 34859 | 9/1981 | European Pat. Off. |
| 2460761 | 7/1976 | Fed. Rep. of Germany |
| 2110498 | 6/1983 | United Kingdom |

Primary Examiner—Joseph A. Orsino, Jr.
Attorney, Agent, or Firm—Stephen L. Noe

[57] ABSTRACT

A communication apparatus for controllably bidirectionally transferring information between a vehicle and a docking station advantageously utilizes pulsed radiant energy for effecting the information transfer. A first radiant energy emitting device and a first radiant energy detecting device is located on the vehicle and a second radiant energy emitting device and a second radiant energy detecting device is located on the docking station. A first frequency control device recieves electrical signals from the first radiant energy detecting device, produces pulse control signals having a nominal frequency which is variable within a predetermined frequency range, and controllably delivers the produced pulse control signals at the nominal frequency to the first radiant energy emitting device located on the vehicle. A second frequency control device receives electrical signals from the second radiant energy detecting device, produces pulse control signals having a nominal frequency which is variable within a predetermined frequency range, and controllably delivers the produced pulse control signals at the nominal frequency to the second radiant energy emitting device located on the docking station. The frequency of the produced pulse control signals is automatically adaptively modified in response to receiving the electrical signals.

6 Claims, 3 Drawing Figures

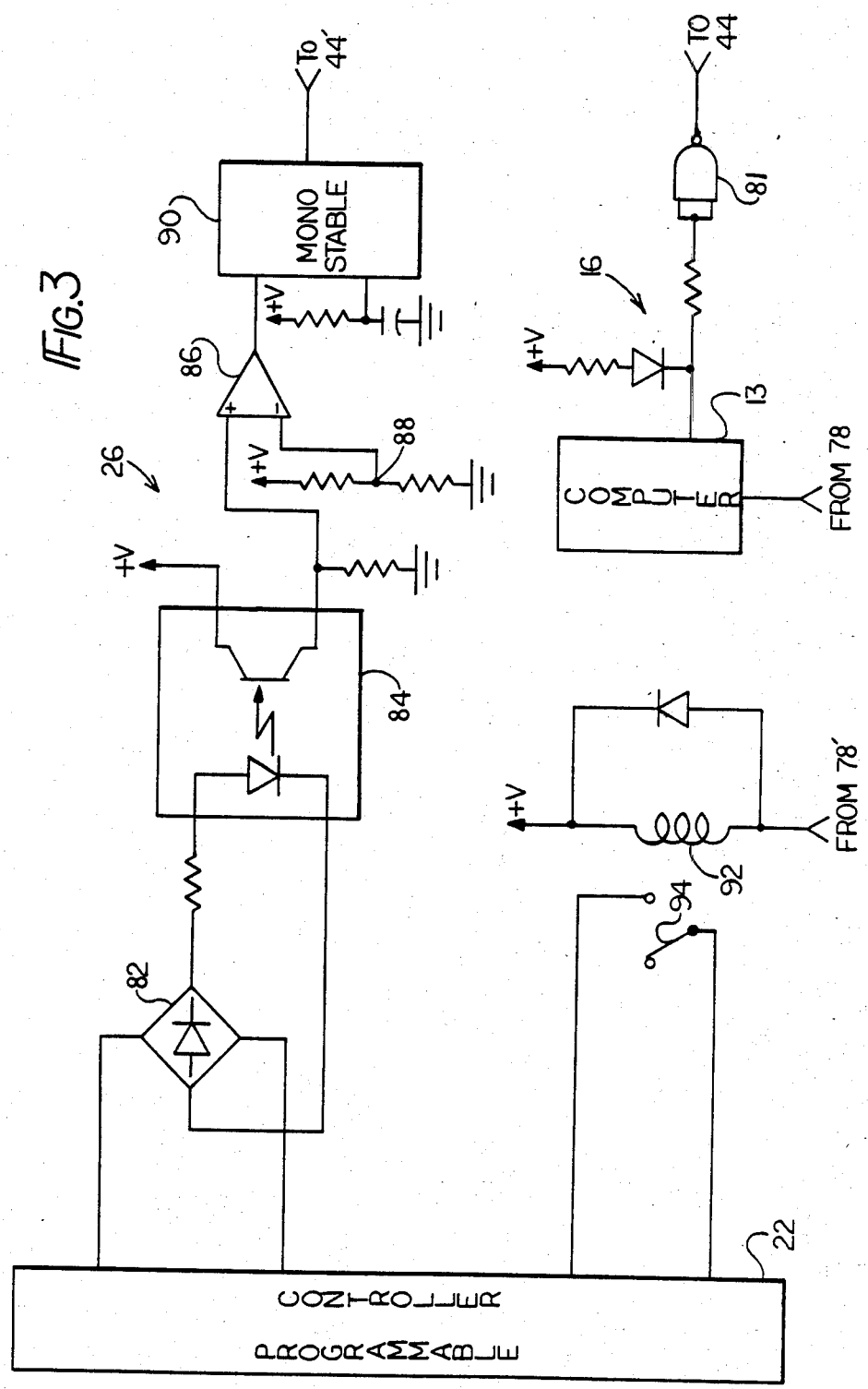

OPTICAL COMMUNICATION APPARATUS FOR A VEHICLE

TECHNICAL FIELD

This invention relates generally to an apparatus for communicating between a vehicle and a docking station, and, more particularly, to a communication apparatus for controllably bidirectionally transferring information between a vehicle and a docking station.

BACKGROUND ART

Various types of unmanned or automatic guided vehicles are under development today. Such vehicles typically maneuver about an industrial facility via some navigation or guidance method, and are used to transport manufacturing items to and from various spaced apart locations or docking stations in the industrial facility. Typically, the docking stations include roller conveyors for loading and unloading cargo from a roller bed on the vehicle.

Such vehicles normally carry onboard computer systems which are in communication with a central facility computer. The central computer system directs the overall operation of the vehicle at a supervisory level, while the onboard computer performs local navigation tasks. At the local level, communication between the vehicle and a particular docking station is required to insure proper operation of the load management system.

The local communication system employed should be rugged for use in an industrial environment and not subject to interference from various noise sources within the environment. The availability of light emitting devices such as infrared light emitting diodes, and corresponding receiving devices such as phototransistors, offers a low cost and highly reliable solution to the communications problem.

Systems utilizing such optical devices have been proposed for other uses in the past. U.S. Pat. 4,025,791, issued to Lennington on May 24, 1977, teaches an optical interrogator and transponder device suitable for identifying a vehicle as it passes into a controlled area. U.S. Pat. No. 4,398,172, issued to Carroll et al. on Aug. 9, 1983, teaches a similar vehicle monitor apparatus. Other known optical communication systems include remote control units offered to operate with various television receivers.

Each of the above-identified devices provides an essentially one way communication system, with one device acting as a signal transmitter and the other as a receiver. Bidirectional communication is neither required nor provided for, yet the disclosed circuitry is quite complex, espensive to manufacture, and subject to failure in an industrial environment.

The present invention is directed to overcoming one or more of the problems as set forth above.

DISCLOSURE OF THE INVENTION

In one aspect of the present invention, a communication apparatus for controllably bidirectionally transferring information between a vehicle and a docking station is provided. The apparatus includes first and second radiant energy emitting devices for producing pulsed radiant energy in response to receiving respective pulse control signals. One of the radiant energy emitting devices is located on the vehicle, and the other on the associated docking station. First and second radiant energy detecting devices produce electrical signals responsive to received radiant energy. Like the radiant energy emitting devices, one of the first and second radiant energy detecting devices is located on the vehicle and the other on a docking station. Each of the vehicle and docking stations has associated with it a frequency control device for receiving electrical signals from the associated radiant energy detecting device, producing pulse control signals having a nominal frequency which is variable within a predetermined frequency range, and controllably delivering the produced pulse control signals at the nominal frequency to the associated radiant energy emitting device, in the absence of receiving any electrical signals from the detecting device. In response to receiving electrical signals from the associated detecting device, the frequency control device modifies the frequency of the respective pulse control signals being delivered to the radiant energy emitting device.

The instant invention provides bidirectional communication between a vehicle and an associated docking station, is simple in construction, and low in manufacturing cost. Owing to the relatively small number of components utilized in the instant invention, the likelihood of component failure is substantially reduced from prior known systems.

BRIEF DESCRIPTION OF THE DRAWINGS

For a better understanding of the present invention, reference may be made to the accompanying drawings, in which:

FIGS. 2 and 3 are a schematic diagram of one embodiment of the present invention as shown in FIG. 1.

BEST MODE FOR CARRYING OUT THE INVENTION

Figure 1:
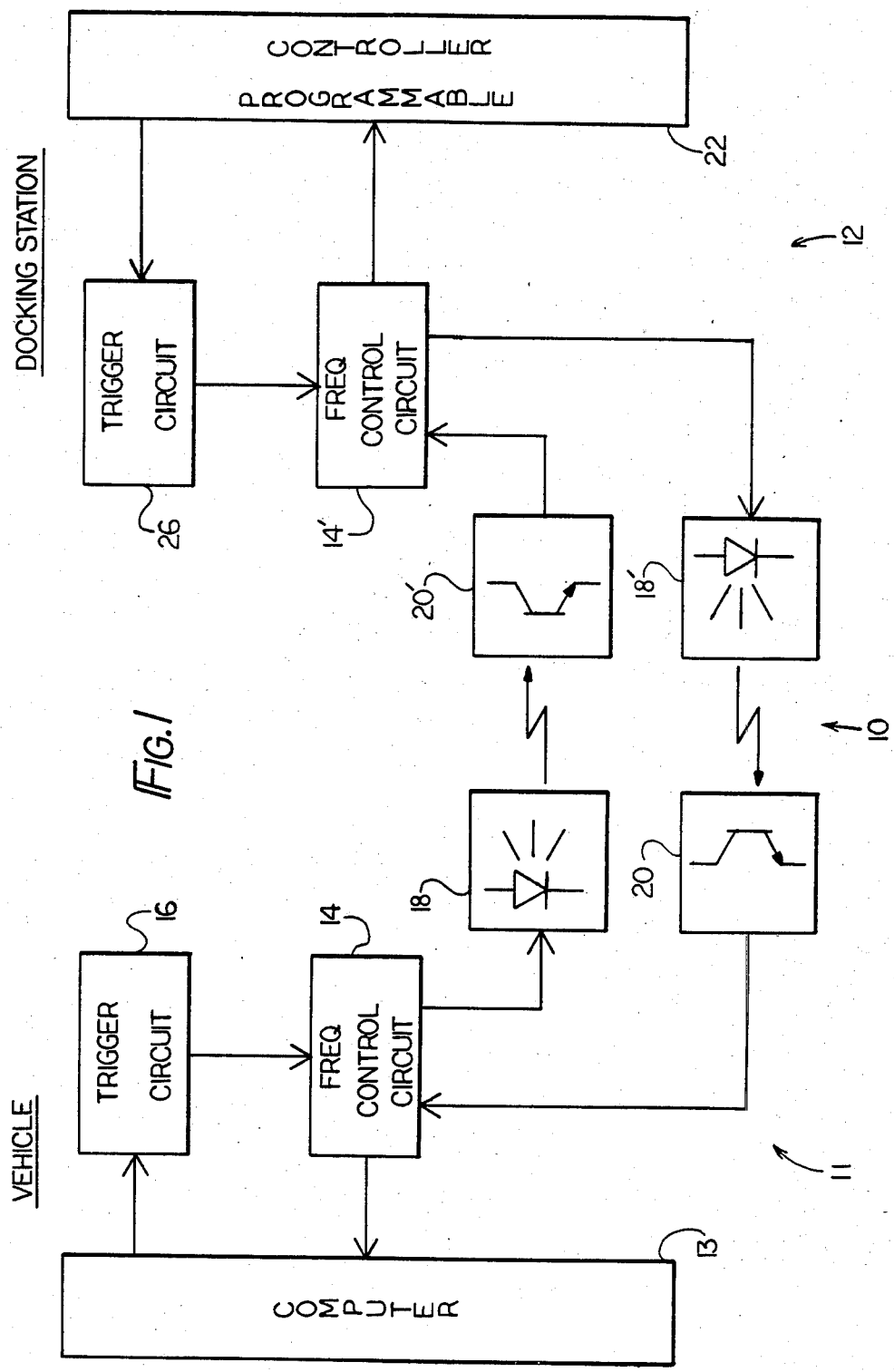
FIG. 1 is a block diagram of a communication apparatus embodying the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In FIG. 1, a bidirectional communication system is shown which includes apparatus associated with a vehicle 11 and apparatus associated with a corresponding docking station 12. The vehicle apparatus includes a microprocessor 13 connected to a first frequency control means 14 through a first trigger means 16. First radiant energy emitting means 18 and radiant energy detecting means 20 are connected to the first frequency control means 14.

The docking station 12 includes a programmable controller 22 connected through a second trigger means 26 to a second frequency control means 14'. Second radiant energy emitting means 18' and radiant energy detecting means 20' are connected to the second frequency control means 14'. The programmable controller 22 is, of course, simply a computer especially suited to an industrial environment, and can be replaced by any suitable computer system.

Figure 2:
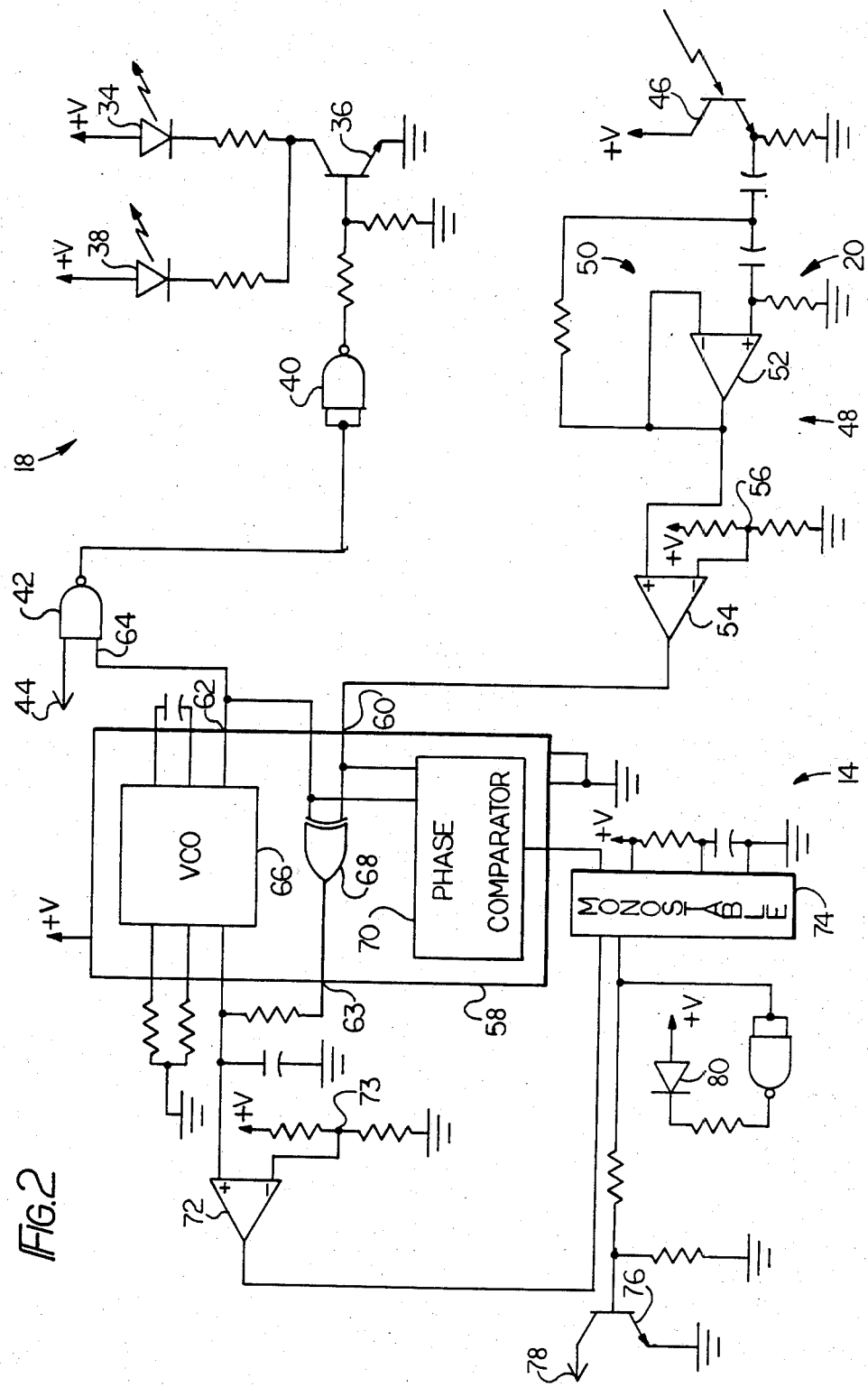

Referring next to FIGS. 2 and 3, an embodiment of the instant invention is shown in schematic form. FIG.

2 is a central circuit diagram common to both the vehicle 11 and the docking station 12. In other words, each of the vehicle 11 and the docking station 12 includes a circuit identical to that presented in FIG. 2 to avoid redundancy, only one such circuit is set forth in the drawings. FIG. 3 illustrates circuitry unique to the vehicle 11 and the docking station 12 that connects at indicated points to the circuit of FIG. 2. The following discussion clarifies the relationship between FIGS. 2 and 3.

FIG. 2 is described below as it relates to components associated with the vehicle 11. Each element of FIG. 2 has a corresponding element associated with the docking station 12, and identified by the prime of the same element number. The first radiant energy emitting means 18 produces pulsed radiant energy in response to receiving respective pulse control signals. The first radiant energy emitting means 18 includes a light emitting diode 34 connected from supply voltage through a current limiting resistor and a transistor 36 to circuit ground. A second light emitting diode 38 and associated current limiting resistor is connected in parallel with the light emitting diode 34. The input to the transistor 36 is connected through a resistor biasing network and an inverter 40 to a logic gate 42. The logic gate 42 is, for example, a dual input NAND gate. One input terminal of the logic gate 42 is the "trigger" input circuit terminal 44.

The first radiant energy detecting means 20 produces electrical signals responsive to received radiant energy. The first radiant energy detecting means 20 includes a phototransistor 46 connected through a current limiting resistor between supply voltage and circuit ground. The first radiant energy detecting means 20 includes a pulse discrimination means 48 for passing electrical signals produced by the first radiant energy detecting means 20 in response to receiving pulsed radiant energy having a pulse frequency greater than a predetermined frequency, and blocking electrical signals produced in response to the first radiant energy detecting means 20 receiving radiant energy having a pulse frequency less than the predetermined frequency. The pulse discrimination means 48 includes a high pass filter circuit 50 having an amplifier 52 connected through a resistor/capacitor network to the phototransistor 46. The output terminal of the amplifier 52 is connected to a first input terminal of a comparator 54. A second input terminal of the comparator 54 is connected to a voltage divider 56.

The first frequency control means 14 receives the electrical signals from the first radiant energy detecting means 20, produces pulse control signals having a nominal frequency which is variable within a predetermined frequency range, controllably delivers the produced pulse control signals at the nominal frequency to the first radiant energy emitting means 18 in the absence of receiving the electrical signal, and automatically adaptively modifies the frequency of the produced pulse control signals in response to receiving the electrical signals. The first frequency control means 14 includes a phase locked loop circuit 58 having a frequency input terminal 60 connected to the output terminal of the amplifier 54, and a frequency output terminal 62 connected to a second input terminal 64 of the logic circuit 42. The phase locked loop 58 is, for example, an integrated circuit such as industry standard type 4046, and includes a voltage controlled oscillator 66, a first phase comparator 68, and a second phase comparator 70.

The phase locked loop frequency input terminal 60 is connected to one input of each of the first and second phase comparators 68,70. The phase locked loop frequency output terminal 62 is connected to a second input terminal of each of the first and second phase comparators 68,70. A signal output terminal 63 of the first phase comparator 68 is connected to an input terminal of the voltage controlled oscillator 66. The signal output terminal 63 of the first phase comparator 68 is also connected to an input terminal of a comparator 72. A second input terminal of the comparator 72 is connected to a voltage divider 73. An output terminal of the voltage comparator 72 is connected to an input terminal of a monostable multivibrator 74. A second input terminal of the monostable multivibrator 74 is connected to an output terminal of the second phase comparator 70. An output terminal of the monostable multivibrator 74 is connected through a resistor biasing network to an output transistor 76. The output transistor 76 is connected to a "receive" output terminal 78. A light emitting diode 80 is also connected through an inverter to the output terminal of the monostable multivibrator 74.

The above description of FIG. 2 discusses each of the main circuit components of the vehicle communications apparatus shown in the block diagram of FIG. 1. Included in the above discussion is the first frequency control means 14, the first radiant energy emitting means 18, and the first radiant energy detecting means 20. The interconnection of various circuit elements is discussed with respect to each of these major circuit components. In like manner, the major circuit components of the docking station 12 includes identical counterpart circuit elements to those discussed above. For example, the second radiant energy emitting means 18' associated with the docking station 12 includes a first light emitting diode 34' and a second light emitting diode 38' connected through a transistor 36' in identical manner to the interconnection of the first and second light emitting diodes 34, 38 with the transistor 36 as described with respect to the first radiant energy emitting means 18. Owing to the exact duplication of the vehicle 11 and docking station 12 circuitry, depicted in FIG. 2, further description of the interconnecting elements is omitted.

Referring now to FIG. 3, the interconnection of elements unique to the vehicle 11 and the docking station 12 are illustrated. Each of the vehicle 11 and the docking station 12 includes a respective trigger means 16, 26. The vehicle trigger means is simply a logic gate 81 having an input terminal connected through a biasing network to the vehicle computer 13, and having an output terminal connected to the "trigger" input terminal 44. The "receive" output terminal 78 is connected directly to the vehicle computer 13.

In the case of the docking station 12, a somewhat more elaborate interface arrangement is necessary. The docking station computer is preferably a programmable controller 22, and typically operates directly from alternating current sources. In order to function properly with the logic circuitry depicted in FIG. 2, an appropriate signal interface is provided. The second trigger means 26 includes a bridge rectifier 82 having input terminals connected to the programmable controller 22 and output terminals connected through a current limiting resistor to an input terminal of an opto-isolator 84. An output terminal from the opto-isolator 84 is connected to a first input terminal of a comparator 86. A second input terminal of the comparator 86 is connected to a voltage divider 88, connected between supply voltage and circuit ground. An output terminal of the comparator 86 is connected to an input terminal of a monostable multivibrator 90, and an output terminal of the monostable multivibrator 90 is connected to the trigger input terminal 44' of the circuit depicted in FIG. 2 and associated with the docking station 12.

In like manner, in order to connect the logic level "receive" output terminal 78' to the programmable controller 22, the "receive" output terminal 78' is connected to a relay coil 92. The relay coil 92 is associated with a relay contact 94, which in turn is connected to the programmable controller 22.

INDUSTRIAL APPLICABILITY

Operation of the appartus 10 is best described in relation to its use for controllably bidirectionally transferring load management information between a material handling vehicle and an associated docking station. In a typical load transfer arrangement, each of the vehicle 11 and the docking station 12 includes a motorized conveyor adapted to move cargo from place to place. For purposes of the following discussion, it is assumed that the vehicle 11 is positioned in a location relative to the docking station 12 sufficient to allow transfer of cargo between the vehicle conveyor and the stationary docking station conveyor. With the vehicle 11 and the docking station 12 having these relative positions, the communication apparatus located on each of the vehicle 11 and the docking station 12 are aligned for optical communication. In other words, radiant energy emitted from one of the first and second radiant energy emitting means 18, 18' impinges on an opposing one of the first and second radiant energy detecting means 20, 20'.

Assuming first that neither of the first and second radiant energy emitting means 18, 18' is active or in an "on" state, any radiant energy signal received by the phototransistor 46, 46' is due solely to ambient or spurious signals, for example, sunlight or relatively constant artificial light. The electrical signal produced by the phototransistor 46, 46' as a result of the reception of any radiant energy is first applied to the pulse discrimination means 48, 48'. The pulse discrimination means 48, 48' consists of a second order high pass filter having a cut off frequency sufficient to block electrical signals below the normal pulse frequency of the radiant energy emitting means 18, 18'. Therefore, the voltage signal applied to the comparator 54, 54' is less than the reference signal applied by the voltage divider 56, 56' and the frequency input signal delivered to the phase locked loop 58, 58' at the terminal 60, 60' is a steady state logic "zero" signal.

The phase locked loop 58, 58' is a well-known and understood commercial circuit, and is only briefly described herein. Essentially, the voltage controlled oscillator 66, 66' delivers a frequency having a nominal value, which frequency is modified by a voltage signal supplied to the voltage controlled oscillator 66, 66'. The value of the voltage signal is determined by the phase difference between the frequency of the output signal at the frequency output terminal 62, 62' and the frequency of the input signal at the frequency input terminal 60, 60'. This phase difference is determined by the first phase comparator 68, 68'. In response to the zero voltage signal at the frequency input terminal 60, 60', the phase locked loop 58, 58' delivers a pulse control signal having a nominal frequency of, for example, 5 KHz, from the frequency output terminal 62, 62' to the logic gate input terminal 64, 64' However, this pulse control signal is blocked by the lack of a "trigger" signal at the other input terminal 44, 44' of the logic gate 42, 42'.

The second phase comparator 70, 70' also compares the pulse control signal from the voltage controlled oscillator 66, 66' with the frequency input signal at the frequency input terminal 60, 60'. The second phase comparator 70, 70' then delivers a pulse having a duration responsive to the difference in phase between the two input signals, to the monostable multivibrator 74, 74'. The monostable multivibrator 74, 74' triggers on the leading edge of the pulse delivered from the second phase comparator 70, 70' and, upon being triggered, turns on the transistor 76, 76' and delivers a signal to the "receive" terminal 78, 78'. However, with no signal being received by the phototransistor 46, 46', the monostable multivibrator 74, 74' is maintained in an "off" state by the output signal delivered from the first phase comparator 68, 68' being less than the reference signal delivered to the comparator 72, 72' by the voltage divider 74, 74'. Therefore, in the quiescent state, wherein neither of the first and second radiant energy emitting means 18, 18' is "on", the status of the "receive" terminal 78, 78' is a logic "0". For diagnostic purposes, this is indicated by the light emitting diode 80, 80' remaining "off".

Assuming now that the second radiant energy emitting means 18' located on the docking station 12 begins to pulse at a nominal frequency, for example, 5 Khz, the communications apparatus associated with the vehicle 11 operates in the following manner. The radiant energy pulses from the second radiant energy emitting means 18' are received by the phototransistor 46. Electrical signals representing the radiant energy pulses are passed through the discriminator means 48 and are received by the phase locked loop 58 at the frequency input terminal 60. The first phase comparator 68 delivers the phase difference signal to the voltage controlled oscillator 66 which, in turn, automatically adaptively adjusts the nominal operating output frequency to correspond to the received input frequency. The input and output frequencies are thus brought into synchronization, and the signal delivered from the first phase comparator 68 to the comparator 72 causes the comparator 72 to deliver an enable signal to the monostable multivibrator 74. Consequently, the monostable multivibrator 74 is triggered by the leading edge of the pulse delivered from the second phase comparator 70, and the transistor 76 and light emitting diode 80 are turned "on" by the resulting signal delivered from the monostable multivibrator 74. The resulting "receive" signal is delivered at the "receive" terminal 78.

If it is desired that the first radiant energy emitting means 18 located on the vehicle 11 be turned "on", a "transmit" signal is delivered from the vehicle computer 13 to the first trigger means 16. This transmit signal causes the logic gate 81 to deliver a "trigger" signal to the "trigger" input terminal 44 of the logic gate 42. The trigger signal enables the logic gate 42 to pass the pulse control signal from the voltage controlled oscillator through the logic gate 40 to the transistor 36. Responsively, the transistor 36 is pulsed "on" and "off" at the frequency determined by the pulse control signal, and both of the light emitting diodes 34, 38 are correspondingly pulsed "on" and "off". The light emitting diode 38 is again provided for diagnostic purposes, while the light emitting diode 34 delivers radiant energy pulses to the corresponding phototransistor 46' located on the docking station 12.

Owing to the fact that the phase locked loop 58, 58' attempts to reduce the difference in frequency between the voltage controlled oscillator output frequency and input frequency signals to zero and the phase difference between the input and output frequency signals to 90°, the pulse control signals are maintained in an out-of-phase relationship with the electrical signals received from the phototransistor 46. This out-of-phase relationship is useful in avoiding problems caused by self reflection between the light emitting diode 34, 34' and phototransistor 46, 46' of a single communications unit. For example, reflection of radiant energy emitted by the light emitting diode 34 onto the surface of the phototransistor 46 results in the phase locked loop voltage controlled oscillator 66 attempting to lock onto its own produced output frequency. This causes the phase locked loop 58 to produce an output frequency having a minimum frequency value. Therefore, the output signal delivered from the first phase comparator 68 is delivered to the comparator 72 at a level insufficient to cause the comparator 72 to deliver an enable signal to the monostable multivibrator 74. Consequently, the monostable multivibrator 74 is prevented from delivering a "receive" signal to the "receive" terminal 78.

As can be determined from the above description, both of the communication circuits associated with the vehicle 11 and the docking station 12 are adapted to produce a "receive" signal in response to detecting a particular radiant energy frequency signal delivered to an associated radiant energy detecting means 20, 20'. Both circuits are particularly designed to prevent false indications owing to either ambient or spurious radiant energy signals, or to self reflected radiant energy signals.

The first trigger means 16, associated with the vehicle 11, is described above. The second trigger means 26, associated with the docking station 12, must be sufficient to produce a "trigger" signal at a logic voltage level in response to a relatively high voltage command signal from the programmable controller 22. Referring to FIG. 3, an AC signal is delivered to the bridge rectifier 82 by the program controller 22. This signal is rectified and delivered to the input of the opto isolator 84, which, in turn, produces a voltage signal that is delivered to the comparator 86. The comparator 86 merely prevents low level signals from inadvertently passing to the communications device, caused, for example, by leakage current in the opto isolator 84. The signal delivered by the comparator 86 is a pulsing signal having a frequency representative of the AC signal applied to the bridge rectifier 82. This pulsing signal is delivered to the monostable multivibrator 90 which supplies the "trigger" signal to the "trigger" input terminal 44' of the communications device located on the docking station 12.

In a similar manner, the "receive" signal must be converted from the logic voltage level to an AC signal. Therefore, the "receive" signal delivered from the terminal 78' is used to drive the coil 92 of a relay, which, in turn, closes a set of relay contacts 94 and delivers the AC signal to the programmable controller 22.

As an example of bidirectional communications utilized in the apparatus 10, assume again that the vehicle 11 is positioned in proximity to the docking station 12, and that the vehicle 11 is required to unload cargo from its roller bed to a conveyor at the docking station 12.

Upon stopping in position, a handshaking protocol is established. The vehicle 11 turns "on" the first radiant energy emitting means 18, and the programmable controller 22 receives this signal as described above. The docking station 12 then turns "on" the corresponding second radiant energy emitting means 18', which signal is likewise received by the microcomputer 13 of the vehicle 11. Since both the vehicle 11 and the docking station 12 have received signals indicating the presence of the other, the communication link is established and both the microcomputer 13 and programmable controller 22 turn "off" the trigger signals, breaking the communication link and ending the handshake protocol.

The one of the vehicle 11 and the docking station 12 having cargo to unload, in this case assumed to be the vehicle 11, again turns "on" the first radiant energy emitting means 18'. The docking station 12 receives the signal from the vehicle 11, responsively turns "on" its motorized conveyor system to accept the load, and then turns "on" its respective second radiant energy emitting means 18' to indicate to the vehicle 11 that it is ready to accept the cargo. The vehicle 11 receives the signal from the docking station 12, and turns "on" its roller bed to transfer the cargo to the docking station conveyor. Upon sensing receipt of the cargo, by various available means such as pressure sensors, proximity detectors, etc., the docking station 12 turns "off" the second radiant energy emitting means 18'. The vehicle 11 acknowledges that the cargo has been received by the docking station 12, and responsively turns "off" the first radiant energy emitting means 18. At this point, the transfer of cargo from the vehicle 11 to the docking station 12 is complete and the vehicle 11 is free to proceed to its next assigned task. Transfer of cargo in the opposite direction, from the docking station 12 to the vehicle 11, is accomplished in exactly the same manner with the order of information transfer being simply reversed from that described above.

Therefore, the above described invention advantageously provides a bidirectional communication system for transferring information between a vehicle 11 and a docking station 12, that is simple and low cost to manufacture and maintain. It is rugged for use in an industrial environment and is not subject to interference from ambient conditions.

Other aspects, objects, advantages, and uses of this invention can be obtained from a study of the drawings, the disclosure, and the appended claims.

I claim:

1. Communication apparatus for controllably bidirectionally transferring information between a vehicle and a docking station, comprising:

first and second radiant energy emitting means for producing pulsed radiant energy in response to receiving respective pulse control signals, one of said first and second radiant energy emitting means being located on said vehicle and the other on said docking station;

first and second radiant energy detecting means for producing electrical signals responsive to received radiant energy, one of said first and second radiant energy detecting means being located on said vehicle and the other on said docking station;

first frequency control means for receiving said electrical signals from said one of said first and second radiant energy detecting means located on said vehicle, producing pulse control signals having a nominal frequency which is variable within a predetermined frequency range, controllably delivering said produced pulse control signals at said nominal frequency to said one of said first and second radiant energy emitting means located on said vehicle in the absence of receiving said electrical signals, and automatically adaptively modifying the frequency of said respective produced pulse control signals in response to receiving said electrical signals;

second frequency control means for receiving said electrical signals from said one of said first and second radiant energy detecting means located on said docking station, producing pulse control signals having a nominal frequency which is variable within a predetermined frequency range, controllably delivering said produced pulse control signals at said nominal frequency to said one of said first and second radiant energy emitting means located on said docking station in the absence of receiving said electrical signals, and automatically adaptively modifying the frequency of said respective produced pulse control signals in response to receiving said electrical signals; and wherein said vehicle includes first trigger means for controllably delivering a transmit trigger signal to said first frequency control means in response to predetermined status conditions of said vehicle, said docking station includes second trigger means for controllably delivering a transmit trigger signal to said second frequency control means in respose to predetermined status conditions of said docking station, and each of said first and second frequency control means include logic means for receiving said respective transmit trigger signal and blocking delivery of said respective pulse control signals to said respective one of said first and second radiant energy emitting means in response to the absence of said transmit trigger signal.

2. Communication apparatus, as set forth in claim 1, wherein each of said first and second frequency control means includes a respective phase locked loop circuit having an input terminal connected to said respective one of said first and second radiant energy detecting means, and an output terminal connected to said respective one of said first and second radiant energy emitting means.

3. Communication apparatus, as set forth in claim 1, wherein each of said first and second radiant energy detecting means includes respective pulse discrimination means for passing electrical signals produced by said respective one of said first and second radiant energy detecting means in response to receiving pulsed radiant energy having a pulse frequency greater than a predetermined frequency, and blocking electrical signals produced in response to said respective radiant energy detecting means receiving radiant energy having a pulse frequency less than said predetermined frequency.

4. Communication apparatus for controllably bidirectionally transferring information between a vehicle and a docking station, each of said vehicle and said docking station having a respective computer associated therewith, comprising:
a first light emitting diode positioned on said vehicle;
a first phototransistor positioned on said vehicle;
a first phase locked loop having a frequency input terminal connected to said first phototransistor, a frequency output terminal connected to said first light emitting diode, and a signal output terminal connected to said vehicle;
a second light emitting diode positioned on said docking station;
a second phototransistor positioned on said docking station;
a second phase locked loop having a frequency input terminal connected to said second phototransistor, a frequency output terminal connected to said second light emitting diode, and a signal output terminal connected to said docking station computer;
a first logic gate serially connected between said first light emitting diode and said first phase locked loop frequency output terminal and having a trigger input terminal connected to said vehicle computer, and a second logic gate serially connected between said second light emitting diode and said second phase locked loop frequency output terminal and having a trigger input terminal connected to said docking station computer; and
wherein respective ones of said first and second light emitting diodes and said first and second phototransistors are adapted to be in optical alignment with one another in response to said vehicle being positioned at a predetermined location relative to said docking station.

5. Communication apparatus, as set forth in claim 4, including a first filter circuit serially connected between said first phototransistor and said first phase locked loop frequency input terminal, and a second filter circuit serially connected between said second phototransistor and said second phase locked loop frequency input terminal.

6. Communication apparatus for controllably bidirectionally transferring information between a vehicle and a docking station, comprising:
first and second radiant energy emitting means for producing pulsed radiant energy in response to receiving respective pulse control signals, one of said first and second radiant energy emitting means being located on said vehicle and the other on said docking station;
first and second radiant energy detecting means for producing electrical signals responsive to received radiant energy, one of said first and second radiant energy detecting means being located on said vehicle and the other on said docking station;
first frequency control means for receiving said electrical signals from said one of said first and second radiant energy detecting means located on said vehicle, producing pulse control signals having a nominal frequency which is variable within a predetermined frequency range, controllably delivering said produced pulse control signals at said nominal frequency to said one of said first and second radiant energy emitting means located on said vehicle in the absence of receiving said electrical signals, and automatically adaptively modifying the frequency of said respective produced pulse control signals to be substantially equal to but out of phase with said respective received electrical signals in response to receiving said respective electrical signals;
second frequency control means for receiving said electrical signals from said one of said first and second radiant energy detecting means located on said docking station, producing pulse control signals having a nominal frequency which is variable within a predetermined frequency range, controllably delivering said produced pulse control signals at said nominal frequency to said one of said first and second radiant energy emitting means located on said docking station in the absence of receiving said electrical signals, and automatically adaptively modifying the frequency of said respective produced pulse control signals to be substantially equal to but out of phase with said respective received electrical signals in response to receiving said electrical signals; and wherein said vehicle includes first trigger means for controllably delivering a transmit trigger signal to said first frequency control means in response to predetermined status conditions of said vehicle, said docking station includes second trigger means for controllably delivering a transmit trigger signal to said second frequency control means in response to predetermined status conditions of said docking station, and each of said first and second frequency control means include logic means for receiving said respective transmit trigger signal and blocking delivery of said respective pulse control signals to said respective one of said first and second radiant energy emitting means in response to the absence of said transmit trigger signal.

* * * * *